United States Patent
Heinzl et al.

(10) Patent No.: US 6,494,164 B2
(45) Date of Patent: Dec. 17, 2002

(54) APPARATUS FOR ADDING ADDITIVES DURING THE CONDITIONING OF ANIMAL FEED

(75) Inventors: Wolfgang Heinzl, Wachenheim (DE); Jörg Braun, Offenbach (DE); Roland Betz, Niederkirchen (DE); Barton Cousins, Böhl-Iggelheim (DE); Hans-Peter Harz, Dudenhofen (DE); Ulrich Heindl, Hong Kong (HK)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/964,795

(22) Filed: Sep. 28, 2001

(65) Prior Publication Data

US 2002/0088403 A1 Jul. 11, 2002

(30) Foreign Application Priority Data

Oct. 2, 2000 (DE) .......................... 100 48 868

(51) Int. Cl.⁷ ................... A01K 5/00; A23G 3/26; B05C 5/00; A23B 4/14
(52) U.S. Cl. ..................... 119/51.02; 118/19; 118/24; 99/516
(58) Field of Search ............... 119/51.02, 57.9; 118/19, 24, 320, 683; 99/516

(56) References Cited

U.S. PATENT DOCUMENTS

| | | | |
|---|---|---|---|
| 3,159,142 A | * 12/1964 | Bares et al. | 119/57.2 |
| 4,712,511 A | * 12/1987 | Zamzow et al. | 119/51.02 |
| 5,069,118 A | * 12/1991 | Bergquist et al. | 99/516 |
| 5,363,754 A | * 11/1994 | Coles et al. | 99/516 |
| 5,911,827 A | * 6/1999 | Heller | 118/19 |
| 5,968,572 A | * 10/1999 | Behnke et la. | 118/19 |
| 6,056,822 A | 5/2000 | Jefferson et al. | 118/683 |
| 6,331,210 B1 | * 12/2001 | Dodd | 118/24 |

FOREIGN PATENT DOCUMENTS

| | | |
|---|---|---|
| DE | 43 06 514 | 9/1994 |
| WO | Wo 98/54980 | 12/1998 |
| WO | WO 99/51107 | 10/1999 |

\* cited by examiner

*Primary Examiner*—Charles T. Jordan
*Assistant Examiner*—Elizabeth Shaw
(74) *Attorney, Agent, or Firm*—Keil & Weinkauf

(57) ABSTRACT

A process and an apparatus are described for adding additives during the conditioning of animal feed. The feed is transferred from a container (1) into a conditioner (3) via a feed screw (2) at an inlet point (M). In the conditioner (3), the feed is transported by a mixing screw (12) from an inlet point (M) along a path (A) to an exit point (N), and is exposed to vapor in the course of this. One or more additives (5) which are introduced into the conditioner (3) through one or more ports (10) are added to the feed which, has passed through x% of the path (A) in the conditioner (3). The feed and the additives (5) added through one or more ports (10) are mixed on the remaining (100-x)% of the path (A) to form a mixture (6). The mixture (6) leaving the conditioner (3) at the exit point (N) is transferred to a pelleting press (7), where the mixture (6) is formed into pellets (8). The pellets (8) are finally transferred to a cooling device (9).

The additives, in particular enzymes, vitamins, carotenoids and antibiotics, are not added to the main feed components until toward the end of the conditioning step. In this manner, these relatively heat-labile substances are exposed to elevated temperatures only for a relatively short time and experience much less stress than would be the case for complete passage through the conditioning unit.

13 Claims, 1 Drawing Sheet

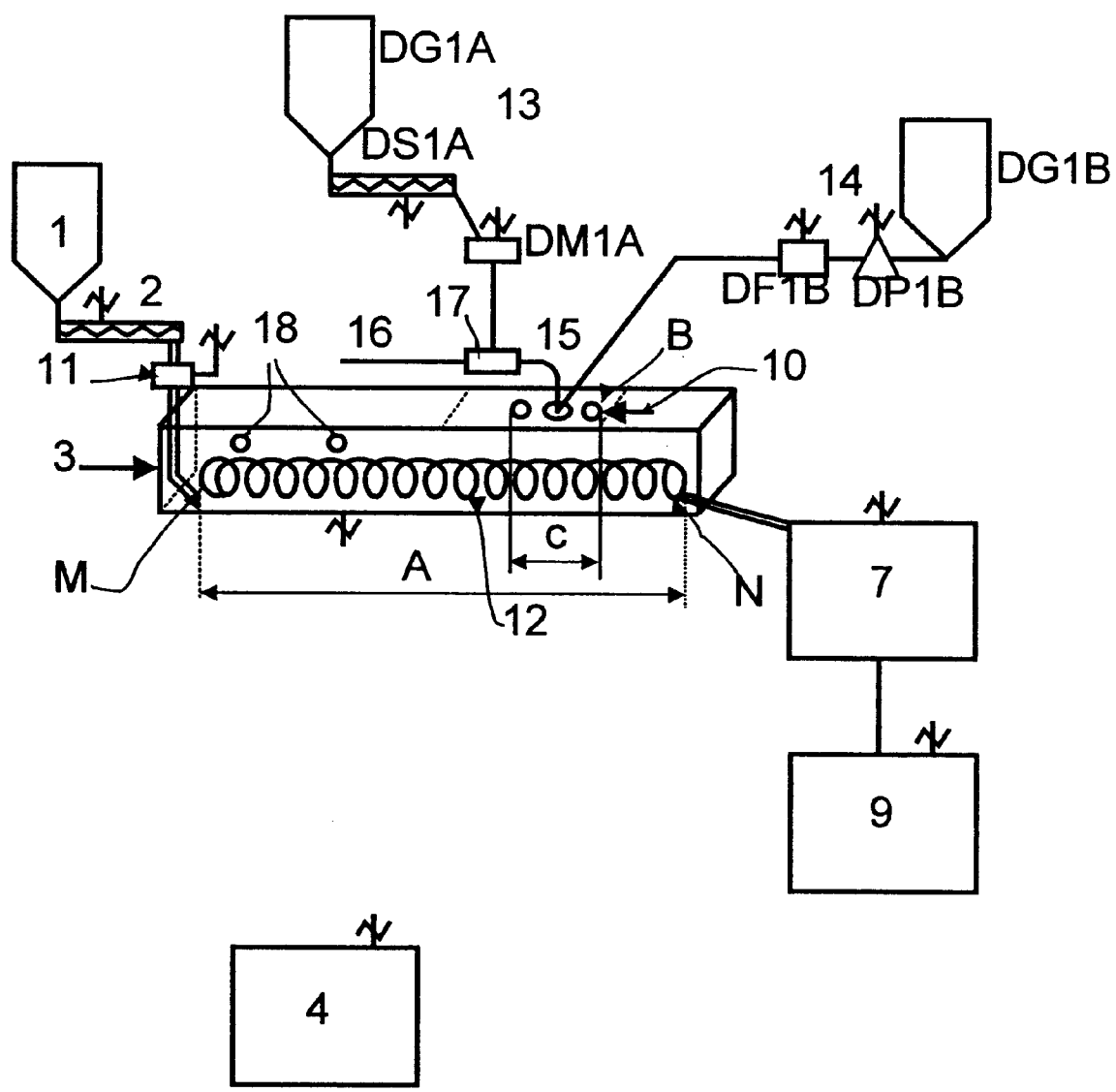

APPARATUS FOR ADDING ADDITIVES DURING THE CONDITIONING OF ANIMAL FEED

The invention relates to a process and an apparatus for adding additives during the conditioning of animal feed.

Animals receive their feed predominantly either in pulverulent form (meal) or as pressed pellets. In addition to the main feed components, animal feed generally also comprises additives, such as enzymes, vitamins or antibiotics. Such additives can be added to the feed in different ways.

U.S. Pat. No. 6,056,822 describes a general process for any desired types of animal feed, in which feed additives, for example enzymes, are applied in dissolved form to cooled feed pellets in what is termed the "PPA (Post Pelleting Application) process", that is to say after the pelletizing process. The advantage of this method is that the substances applied do not suffer any loss in activity due to the action of heat owing to the conditioning step which precedes the feed pelletizing. A disadvantage is that the additives cannot be applied to the pellets in powder form and, in addition, technically complex equipment is required in order to enable the metering, dissolution and spraying of enzyme solutions. In addition to the extensive equipment requirements and the associated costs, there is a further disadvantage of the PPA process, namely the fact that the additives to be applied are not always distributed homogeneously on the feed.

DE-A 43 06 514 describes a process and an apparatus in which, within the pelletizing machine, lignin sulfone-based pressing aids are added to the feed to be pressed. However, using this method only those liquids can be sprayed or atomized onto the material to be pressed that do not prevent processing of the material to be pressed in the press owing to excessive moisture content. A further disadvantage of this method is that homogeneous mixing of the added liquid with the material to be pressed is not ensured in this manner.

WO 99/51107 indicates a process for producing fish food in which dissolved enzymes are added to the main food constituents as early as before the conditioning step. The enzyme used in this case, transglutaminase, acts to catalyze a reaction of proteins present in the food and also stabilizes the shape of the pellets produced. The advantage of this method is that the enzymes are mixed better with the food, which results in a homogeneous distribution of all additives. However, the food mixture, including the added enzymes, undergoes very great stress during the conditioning step, and during the subsequent pelletizing step. This stress is all the greater, the higher the temperatures employed and the residence time of the food in the conditioning unit and the pelletizing unit. This means that the enzyme activity of the end product is very greatly, or at least considerably, limited. For this reason, the food mixture can be exposed to a maximum of 60° C., and the additives are admixed in a very great excess, compared with the PPA process.

WO 98/54980 describes a process in which dissolved enzymes are formed with a stabilizer to give granules which then pass, together with the main feed components, through a conditioning and pelletizing process. Because of the action of the granule carrier material, which consists of carbohydrates, the admixed enzymes exhibit increased stability, nevertheless they must be used in a great excess, in order to be able to make up for the loss of activity during the conditioning and pelletizing process. A further disadvantage of this process is also that the production of the enzyme-containing granules is associated from the beginning with additional costs and is time-consuming.

It is an object of the present invention to develop a process in which, firstly, additives are added to the feed in a smaller amount and inexpensively, that is to say using less equipment, and secondly these additives are uniformly distributed in the pelletized feed end product.

We have found that this object is achieved by a process and an apparatus underlying the process which comprise the following features:

a) the feed is transferred from a container via a feed screw at an inlet point into a conditioner, b) the feed is transported in the conditioner by a mixing screw from the inlet point along a path to an exit point, and is exposed to vapor in the course of this, c) one or more additives which are introduced into the conditioner through one or more ports are added to the feed which has passed through x% of the path in the conditioner, d) the feed and the additives added through one or more ports are mixed on the remaining (100-x)% of the path to form a mixture, e) the mixture leaving the conditioner at the exit point is transferred to a pelleting press, f) the mixture is formed into pellets in the pelleting press g) and the pellets are finally transferred to a cooling device.

The great advantage of this process is that the additives, in particular enzymes, vitamins, carotenoids and antibiotics are not added to the main feed components until toward the end of the conditioning step. In this manner, these relatively heat-labile substances are only exposed to elevated temperatures for a relatively short time and experience much less stress than would be the case with complete passage through the conditioning unit. This considerably reduces the loss in activity of the substances added. As a result, significantly smaller amounts of these in part very expensive substances are required, considerably reducing the production costs of pelleted animal feed that comprises additives.

In addition, as a result of the significantly reduced residence time of the additives in the conditioning unit, the temperatures of in each case approximately 80° C. (and above) which are customary in the conditioning and pelletizing steps can be employed, as a result of which more stable pellets are produced. A further advantage of the inventive process is the fact that the additives are still sufficiently well mixed with the main feed components to achieve homogeneous distribution in the feed pellets.

A further advantage is that the inventive process is suitable in particular for adding solids, as a result of which the dissolution and exact metering of the solution of these additives, which are not only time-consuming but also require complex equipment, are avoided as are problems of adhesion to the pellets.

The invention is described below with reference to one drawing.

The single FIG. 1 shows in outline the inventive process and the inventive apparatus. A container 1, which is suitable for storing animal feed, in particular animal feed meal, is connected at its lower end to a feed screw 2, to which is connected a mass flow meter 11. The feed screw 2 and the mass flow meter 11 are connected to a computer unit 4, the feed screw 2 is also provided with a variable servodrive which can be, for example, electric. When the feed screw 2 is actuated, feed is transferred from the container 1 to a conditioner 3.

The animal feed is exposed in the conditioner 3 to vapor which is introduced into the interior of the conditioner 3 through one or more ports 18 which are mounted on the casing of the conditioner 3. The vapor used is preferably steam at a pressure of, preferably, from 1.5 to 3 bar. The pressure may also be below or above this range. The vapor establishes temperatures of preferably 80° C. and above in the interior of the conditioner 3. The temperature may fall below this range. The vapor is introduced, and the feed is conditioned with vapor in the conditioner 3, in a manner known to those skilled in the art.

The feed originating from the container 1 is transported in the conditioner 3 from an inlet point M along a path A using a mixing screw 12 mounted in the interior of the conditioner 3, to an exit point N. In an additional design of the inventive apparatus, the feed in the conditioner 3 is transported by a plurality of parallel mixing screws 12 from the inlet point M along a path A to an exit point N, preferably two mixing screws 12 being used. The mixing screw 12 is connected to the computer unit 4 and is also provided with an electric drive.

In the upper part of the conditioner 3, in a region B situated above the path A, one or more ports 10 are mounted, which ports are of a nature such that one or more additives 5 can be introduced into the interior of the conditioner 3 in order there to be added to the feed that has already been transported x% of the path A from the mixing screw 12. On the remaining (100-x)% of the path A, the feed, together with the additives 5, is transported to the exit point N and mixed by the screw movement, as a result of which a mixture 6 is obtained. The mixture 6 is composed of the main feed constituents which originate from the container 1, and the additives 5 added via the port 10.

The value x of the path A is in a range from 50 to 100. The dimensions of the path A will be described in more detail with reference to the example below. The conditioner 3 has, in designs known to those skilled in the art, a length of approximately 2 m. This means that the path A also has a length of about 2 m. For the sake of simplicity, let the length of the path A in this example be exactly 2 m. In the inventive apparatus, the additives 5 added via the ports 10 thus impact main feed components that have already been transported at least 1 m, but less than 2 m, on the path A, by the mixing screw 12. Reference is expressly made to the fact that the length of the conditioner 3 can be not only greater, but also smaller, than 2 m. The length of the path A also changes accordingly, and the region of the path A in which the additives 5 impact the main feed components may be determined in a similar manner to the above example. This principle can be applied to all conditioner designs known to those skilled in the art.

The ports 10, in the event that there are two or more ports, are disposed in the upper part of the vessel 3 in the region B along a path C which is either perpendicular to or parallel to the path A. An asymmetric arrangement or an arrangement of the ports 10 in the region B which differs from the linear arrangement along the path C is also conceivable. As port 10, any type of port can be used which is suitable for introducing solids and/or liquids, in particular nozzles and apparatuses with which liquids and/or solids can be introduced with the aid of gases, in particular air.

The inventive apparatus is particularly suitable for adding solid additives 5 to feed. Suitable solid additives 5 are all substances which are used in feedstuff production, particularly antibiotics, vitamins and carotenoids, in particular enzymes. The solid additives 5 are situated in a metering vessel DG1A, from which they are transported to a lock 17 via a feed screw DS1A, a measuring apparatus DM1A and the lines which are required for this. The metering vessel DG1A, the feed screw DS1A and the measuring apparatus DM1A are the essential components of the metering unit 13.

The lock 17 is connected via a line 16 to a gas source. The gas used is, in particular, compressed air. However, other gases or gas mixtures can also be used for which no adverse health consequences are to be feared in the event of their contact with the additives and the main feed components. The gas source is not a constituent of the inventive apparatus, it is mounted externally to the inventive apparatus, and it is connected to the line 16 in a manner known to those skilled in the art. The lock 17 is designed in such a manner that the additives 5 originating from the metering unit 13 are combined with the gas coming from the line 16 and are fed through one or more ports 10 to the conditioner 3 by the gas pressure via an inlet line 15 which is connected to the lock 17. In addition, the lock 17 means that no vapor can escape from the conditioner 3 and thus prevents possible blockage of the individual components of the metering unit 13 caused by the introduction of moisture. The inlet line 15 can, if appropriate, be of a nature such that it can be connected at the same time to a plurality of ports 10 of the conditioner 3 via one or more branches.

According to the invention, the lock 17 can also be of a nature such that, in a similar manner to its design described above, a plurality of metering units 13 are connected to the lock 17, the nth metering unit 13 consisting in each case essentially of a metering vessel DGnA, a feed screw DSnA and a measuring apparatus DMnA. Generally, a separate metering unit 13 is provided for each solid additive 5.

In addition, there is the possibility that each metering unit 13 is connected in each case to a separate lock 17 that is in turn connected to a gas source. The additives 5 are fed from the respective lock 17 through one or more ports 10 to the conditioner 3 by the gas pressure via the respective inlet line 15. This design of the inventive apparatus thus consists of n metering units 13, n locks 17 and n inlet lines 15.

The conditioner 3 is designed in such a manner that the additives 5 can also be added to the main feed components through the ports 10 either completely or partly in liquid or dissolved form. In this case, one or more metering units 13 are replaced by one or more metering units 14. The liquid or dissolved additives 5 are situated in a metering vessel DG1B from which they are fed through one or more ports 10 to the conditioner 3 via a metering pump DP1B, a flow meter DF1B and the lines required therefor. A metering unit 14 essentially consists of the metering vessel DG1B, the metering pump DP1B and the flow meter DF1B. The nth metering unit 14 essentially consists in each case of a metering vessel DGnB, a metering pump DPnB and a flow meter DFnB. Generally, a separate metering unit 14 is provided for each liquid or dissolved additive 5.

The feed screws DSnA and the measuring apparatuses DMnA and, if appropriate, the metering pumps DPnB and the flow meters DFnB are connected to the computer unit 4; the feed screws DSnA and, if appropriate, the metering pumps DPnB are additionally provided with an electric servodrive.

The individual apparatus constituents are generally organized in such a manner that the additives 5 can be added to the total amount of feed in a ratio which is in the range from 0.001 to 0.2% by weight, preferably from 0.005 to 0.02% by weight. However, this apparatus may also be applied to larger amounts of additives 5 without problems.

The mixture 6 exits from the conditioner 3 at the exit point N and is transferred to the pelleting press 7. The pelleting press 7 forms compressed feed pellets 8 from the mixture 6. The pelleting press 7 used can be all apparatuses familiar to those skilled in the art which enable feed pellets to be pressed in a continuous-flow process at a temperature of, preferably, from 65 to 90° C. However, the temperature may also be above or below this range. The pelleting press 7 produces pellets 8 having a mean diameter of from 1 to 10 mm, preferably from 2 to 8 mm, but the diameter may be above or below this range as well. The pelleting press 7 is connected to the computer unit 4 and is additionally provided with an electric servodrive.

From the pelleting press 7, the finished feed pellets 8 are transferred to a cooling device 9. The cooling device 9 is connected to the computer unit 4. All apparatuses familiar to those skilled in the art can be used as cooling device 9.

The interaction, which is controlled via the computer unit 4, between the individual components of the inventive apparatus will be described in more detail below with reference to a possible exemplary application.

The feed is first transferred via the feed screw 2 from the container 1 into the conditioner 3, in which is situated the mixing screw 12 which is operated at a constant speed. The computer unit 4 controls the speed of the feed screw 2 here, but the speed of the feed screw 2 can also be set manually. The speed of the feed screw 2 is controlled in such a manner that optimum capacity and pellet quality can be produced in the pelleting press 7. In the conditioner 3, the feed is transported by the mixing screw 12 from the inlet point M along the path A to the exit point N. The additives 5 are added via the port 10 after the feed has passed along more than half of the path A.

The rate of the additives 5 added to the conditioner 3 through the port 10 is also controlled by the computer unit 4 via the feed screws DSnA and, if appropriate, the pumps DPnB. The computer unit 4 controls the added rate of solid additives 5 via the speed of the feed screws DSnA on the basis of the values measured by the respective measuring apparatuses DMnA. The speed of the feed screws DSnA is matched by the computer unit 4 to the main feed component rate measured by the mass flow meter 11 depending on the desired end concentration of the additives 5 in relation to the total feed rate. If appropriate, the rate of liquid or dissolved additives 5 added via the pumps DPnB is also controlled by the computer unit 4 on the basis of the values measured by the respective flow meters DFnB. The pump speed of the pumps DPnB is matched to the main feed component rate measured by the mass flow meter 11 depending on the desired end concentration of the additives 5 in relation to the total amount of feed.

When the mixture 6, which consists of the main feed components and the additives 5, has arrived in the conditioner 3 at the exit point N, it is transported further from there into the pelleting press 7 and pressed to form pellets which are then transferred into the cooling device 9. The speed of the feed screw 2 thus also determines the residence time of the feed in the pelleting press 7. The pelleting press 7 and the cooling device 9 can be controlled by the computer unit 4.

When the inventive apparatus is switched on or switched off, the inflow and outflow times of the individual apparatus components and the volume of main feed components, and if appropriate additives 5, stored in the threads of the mixing screw 12 are of importance. These values which are determined empirically are taken into account by the computer unit 4, which matches individual apparatus components to one another in this regard. For example, after the feed screw 2 is shut down, the mixing screw 12 continues to operate for the time which the feed requires to cover the path A. The remaining apparatus components controlled by the computer unit 4 are matched accordingly.

In the case of breakdowns in one of the apparatus components, the respective upstream apparatus components are shut down by the computer unit 4, while the respective apparatus components which are downstream continue to run with the respective outflow time.

The computer unit 4 thus matches, in particular, the speeds of the feed screw 2 with the feed screws DSnA and, if appropriate, the pumps DPnB, in order to be able to add the required amount of additives 5 to the feed.

All components of the inventive apparatus are designed in such a manner that, in addition to the computer-controlled standard operation, manual operation of the individual components is also possible.

LIST OF DESIGNATIONS

1 Container
2 Feed screw
3 Conditioner
4 Computer unit
5 Additive
6 Mixture
7 Pelleting press
8 Pellets
9 Cooling device
10 Port
11 Mass flow meter
12 Mixing screw
13 Metering unit
14 Metering unit
15 Inlet line
16 Line
17 Lock
18 Port
Path (A)
Region (B)
Path (C)
Inlet point (M)
Exit point (N)
DG=Metering vessel
DM=Measuring apparatus
DF=Flow meter
DP=Pump
DS=Feed screw

We claim:

1. A computer-aided apparatus for adding additives during the conditioning of animal feed, in which
  a) the feed is transferred from a container (1) via a feed screw (2) at an inlet point (M) into a conditioner (3),
  b) the feed is transported in the conditioner (3) by a mixing screw (12) from the inlet point (M) along a path (A) to an exit point (N), and is exposed to vapor in the course of this,
  c) one or more additives (5) which are introduced into the conditioner (3) through one or more ports (10) are added to the feed which has passed through x% of the path (A) in the conditioner (3),
  d) the feed and the additives (5) added through one or more ports (10) are mixed on the remaining (100-x)% of the path (A) to form a mixture (6),
  e) the mixture (6) leaving the conditioner (3) at the exit point (N) is transferred to the pelleting press (7),
  f) the mixture (6) is formed into pellets (8) in the pelleting press (7)
  g) and the pellets (8) are finally transferred to a cooling device (9).

2. A computer-aided apparatus as claimed in claim 1, wherein the feed is transported in the conditioner (3) by a plurality of parallel mixing screws (12) from the inlet point (M) along a path (A) to an exit point (N), and is exposed to vapor in the course of this.

3. A computer-aided apparatus as claimed in claim 1, wherein the value x of the path (A) is in a range from 50 to 100.

4. A computer-aided apparatus as claimed in claim 1, wherein the ports (10) are connected via an inlet line (15) and a lock (17) connected to a gas source via a line (16) to one or more metering units (13), each of which essentially consists of
   a) a metering vessel (DG1A)
   b) a measuring apparatus (DM1A) and
   c) a feed screw (DS1A).

5. A computer-aided apparatus as claimed in claim 1, wherein the ports (10) are connected to one or more metering units (14), each of which essentially consists of
   a) a metering vessel (DG1B)
   b) a flow meter (DF1B) and
   c) a pump (DP1B).

6. A process for adding additives during the conditioning of animal feed, wherein
   a) the feed is transferred from a container (1) via a feed screw (2) at an inlet point (M) into a conditioner (3),
   b) the feed is transported in the conditioner (3) by a mixing screw (12) from the inlet point (M) along a path (A) to an exit point (N), and is exposed to vapor in the course of this,
   c) one or more additives (5) which are introduced into the conditioner (3) through one or more ports (10) are added to the feed which has passed through x% of the path (A) in the conditioner (3),
   d) the feed and the additives (5) added through one or more ports (10) are mixed on the remaining (100-x)% of the path (A) to form a mixture (6),
   e) the mixture (6) leaving the conditioner (3) at the exit point (N) is transferred to the pelleting press (7),
   f) the mixture (6) is formed into pellets (8) in the pelleting press (7)
   g) and the pellets (8) are finally transferred to a cooling device (9).

7. A process as claimed in claim 6, wherein the additives (5) are added to the feed in solid and/or dissolved form.

8. A process as claimed in claim 7, wherein the additive (5) is enzymes.

9. A process as claimed in claim 7, wherein the additive (5) is vitamins.

10. A process as claimed in claim 7, wherein the additive (5) is antibiotics.

11. A process as claimed in claim 7, wherein the additive (5) is carotenoids.

12. A process as claimed in claim 6, wherein the pellets (8) comprise from 0.001 to 0.2% by weight, preferably from 0.005 to 0.02% by weight, of one or more additives (5).

13. A process as claimed in claim 6, wherein the pellets (8) have a mean diameter of from 1 to 10 mm, preferably from 2 to 8 mm.

* * * * *